(12) United States Patent
Lappe et al.

(10) Patent No.: US 8,506,869 B2
(45) Date of Patent: Aug. 13, 2013

(54) DEVICE AND METHOD FOR MANUFACTURING PLASTIC CONTAINERS

(75) Inventors: Ulrich Lappe, Regensburg (DE); Konrad Senn, Regensburg (DE)

(73) Assignee: Krones AG, Neutraubling (DE)

( * ) Notice: Subject to any disclaimer, the term of this patent is extended or adjusted under 35 U.S.C. 154(b) by 56 days.

(21) Appl. No.: 13/151,318

(22) Filed: Jun. 2, 2011

(65) Prior Publication Data
US 2011/0298145 A1    Dec. 8, 2011

(30) Foreign Application Priority Data
Jun. 2, 2010   (DE) .......................... 10 2010 029 644

(51) Int. Cl.
*B29C 49/68* (2006.01)
*B29C 49/42* (2006.01)

(52) U.S. Cl.
USPC ........ 264/454; 264/535; 425/143; 425/174.4; 425/526

(58) Field of Classification Search
USPC ............... 425/526, 174.4, 143; 264/454, 535
See application file for complete search history.

(56) References Cited

U.S. PATENT DOCUMENTS

| | | | |
|---|---|---|---|
| 4,140,464 A | | 2/1979 | Spurr et al. |
| 4,151,249 A | * | 4/1979 | Lee ............................. 425/526 |
| 4,396,816 A | * | 8/1983 | Krishnakumar et al. ..... 264/454 |
| 5,468,443 A | * | 11/1995 | Takada et al. ................. 425/526 |
| 6,005,223 A | * | 12/1999 | Ogihara ......................... 264/535 |
| 6,730,260 B2 | * | 5/2004 | Vardin et al. .................. 264/535 |
| 7,220,378 B2 | * | 5/2007 | Cochran et al. .............. 425/526 |
| 7,425,296 B2 | * | 9/2008 | Cochran et al. .............. 425/526 |
| 7,491,358 B2 | * | 2/2009 | Gernhuber et al. ........... 264/454 |
| 2002/0011681 A1 | * | 1/2002 | Rose et al. .................... 425/526 |

FOREIGN PATENT DOCUMENTS

| | | |
|---|---|---|
| DE | 2825866 A1 | 12/1978 |
| DE | 69603044 T2 | 10/1999 |
| DE | 19843053 A1 | 3/2000 |
| DE | 19958790 A1 | 6/2001 |
| DE | 10026368 A1 | 11/2001 |
| DE | 69804456 T2 | 7/2002 |
| DE | 69712130 T2 | 11/2002 |
| WO | WO-02087850 A1 | 11/2002 |
| WO | WO-2009141216 A1 | 11/2009 |

OTHER PUBLICATIONS

Search Report for German Application No. 10 2010 029 644.9 dated Jan. 10, 2011.

* cited by examiner

*Primary Examiner* — Robert B Davis
(74) *Attorney, Agent, or Firm* — Marshall, Gerstein & Borun LLP

(57) ABSTRACT

A device for manufacturing plastic containers, including a clocked preform manufacturing means, a temperature control means for thermal conditioning preforms manufactured in the preform manufacturing means, and a continuously working blow molding machine, where the temperature control means is designed and/or configured such that preforms that have been manufactured in one cycle of the preform manufacturing means can be differently temperature controlled.

11 Claims, 3 Drawing Sheets

DEVICE AND METHOD FOR MANUFACTURING PLASTIC CONTAINERS

CROSS-REFERENCE TO RELATED APPLICATION

The present application claims the benefit of priority of German Application No. 102010029644.9, filed Jun. 2, 2010. The entire text of the priority application is incorporated herein by reference in its entirety.

FIELD OF THE DISCLOSURE

The disclosure relates to a device and a method for manufacturing plastic containers; such as in beverage bottling operations.

BACKGROUND

Plastic containers, for example plastic bottles, are usually produced with so-called blow molding machines. In such blow molding machines, plastic preforms, which have been heated before in a temperature control means, are shaped in blow molds to give the desired plastic containers. For this, the preforms are subjected to compressed air in the blow molds.

Thermal conditioning of the preforms in a temperature control means upstream of the blow molding machine is necessary to make the plastic material of the preforms moldable. To ensure constant quality of the produced plastic containers, the preforms must have an exactly defined temperature during the blow molding process.

Usually, the preforms are manufactured beforehand as molded parts, that means in an injection molding process. In this case, it is advantageous to manufacture the preforms in a clocked process where several preforms are manufactured simultaneously in one injection molding operation. A clocked injection molding machine can also be connected in a block with a blow molding machine to combine the manufacturing process of the preforms and the plastic containers. Such a block system is known, for example, from DE 697 12 130.

If a clocked injection molding machine is connected in a block with a continuously working stretch-blow molding machine, more precisely is operated with a blow-molding unit and a temperature control means in a blocked connection, the simultaneously manufactured preforms, however, first must be brought into a line such that they can then be introduced into the temperature control means. By this, the preforms that are the last ones to be introduced into the temperature control means usually have a lower temperature than the preforms that have been introduced before them. Other factors, such as, for example, the mold temperatures in injection molding, can lead to varying temperatures of the produced preforms.

Such a different or varying temperature of the preforms can lead to a varying quality of the manufactured plastic containers.

SUMMARY OF THE DISCLOSURE

It is therefore an aspect of the present disclosure to provide a device and a method for manufacturing plastic containers, which permit the manufacture of plastic containers with a preferably constant quality.

The disclosure provides a device for manufacturing plastic containers, comprising a clocked preform manufacturing means, a temperature control means for thermal conditioning preforms manufactured in the preform manufacturing means, and a continuously working blow molding machine, wherein the temperature control means is designed and/or configured such that the temperature of the preforms that have been manufactured in one cycle of the preform manufacturing means can be differently controlled.

By the possibility of differently controlling the temperatures of the preforms, preforms which are introduced into the temperature control means at different temperatures can be provided with the same predetermined temperature, permitting a constant quality of the manufactured plastic containers.

In other words, the preforms that have been manufactured in one cycle of the preform manufacturing means can be individually temperature controlled, in particular independent of each other.

The manufactured plastic containers can in particular be plastic bottles.

Temperature control can here be defined as heating and/or cooling a preform. In particular, temperature control can be defined as providing a preform with a predetermined temperature profile. The predetermined temperature profile can vary along a longitudinal axis and/or along the periphery of the preform (so-called "preferential heating"). The predetermined temperature profile can also be constant. This means that in this case the preform can be brought to a constant temperature.

Differently controlling the temperature can in this context in particular mean that at least two preforms that have been manufactured in one cycle of the preform manufacturing means, can be temperature-controlled by different temperature control processes.

Different temperature control processes can differ by one or several employed heating elements and/or cooling elements of the temperature control means, and/or by one or several employed temperature control parameter values.

So, the temperature control means can comprise one or several heating elements for heating preforms and/or one or several cooling elements for cooling preforms.

A temperature control parameter can be, for example, a heating duration or a cooling duration, or a frequency and/or intensity of radiation used for heating. Heating elements of the temperature control means can be, for example, microwave heating elements, infrared heating elements, laser heating elements, and/or heating jackets. Cooling elements of the temperature control means can in particular be cooling air elements.

So, the temperature of at least two preforms that have been manufactured in one cycle of the preform manufacturing means can be controlled by different heating elements and/or cooling elements of the temperature control means, and/or for different durations and/or with different frequencies and/or intensities of the radiation used for heating.

The temperature control means can correspond to a continuously working temperature control means.

The blow molding machine can in particular comprise a blow-molding unit. The temperature control means can be a part of the blow molding machine.

The temperature control means can in particular be designed and/or configured such that all preforms manufactured in one cycle of the preform manufacturing means have the same temperature, in particular the same temperature profile, when they enter the blow-molding unit.

The preform manufacturing means, the temperature control means and the blow molding machine can in particular be connected in a block. In other words, the device for manufacturing plastic containers can be a block machine comprising the preform manufacturing means, the temperature control means and the blow molding machine.

The device for manufacturing plastic containers can moreover comprise a plastic recycling device, in particular in a block connection with the preform manufacturing means, the temperature control means and the blow molding machine. The plastic recycling device can provide the plastic for the preform manufacturing means from recycled plastic containers. By this, the environmental balance of the manufactured plastic containers can be improved.

So, in the clocked preform manufacturing means, preforms can be manufactured in a discontinuous production process, preferably in batch operation. In other words, a predetermined number of preforms can be manufactured within one cycle. This can permit a cost-efficient manufacture of preforms.

The clocked preform manufacturing means can in particular be a clocked injection molding means, where in particular a predetermined number of preforms can be injection-molded within one cycle.

The clocked preform manufacturing means can preferably be a compounder with a twin screw extruder in which instead of a dryer, vacuum degassing is provided. This permits an energy efficient manufacture of the preforms because the duration of material drying required for PET can be shortened.

The device for manufacturing plastic containers can moreover comprise a transfer element between the preform manufacturing means and the temperature control means. By the transfer means, the preforms manufactured in the preform manufacturing means can be conveyed, after they have been manufactured, from the preform manufacturing means into the temperature control means. The transfer element can be, for example, a transfer starwheel or a linear conveyor means.

The blow molding machine can in particular be a stretch-blow molding machine. Between the temperature control means and the blow molding machine, another transfer element can be arranged, where the preforms heated in the temperature control means can be conveyed via the further transfer element into the blow molding machine.

The temperature control means can be designed and/or configured such that the temperature control of preforms that have been manufactured in one cycle of the preform manufacturing means is effected based on the temperature of the preforms they exhibit while they are introduced into the temperature control means.

The temperature control means can be embodied in the form of a microwave and/or laser heating. Thereby, temperature control can be carried out individually and with quick response. The temperature control means, in particular in the form of a microwave and/or laser heating, can in particular have a reaction time of less than 1 second.

The temperature control means can in particular comprise one or several microwave heating elements. This permits a very energy efficient heating of the preforms.

The temperature control means can be designed and/or configured such that a first preform that was manufactured in one cycle of the preform manufacturing means and is introduced first into the temperature control means is heated to a lesser degree than a second preform that was manufactured in the same cycle of the preform manufacturing means and is introduced into the temperature control means after the first preform. By this, stronger cooling of preforms which are introduced into the temperature control means later can be compensated, and thus all preforms that have been manufactured in one cycle of the preform manufacturing means can be essentially brought to the same temperature.

The temperature control means can be designed and/or configured such that the temperature control of preforms that have been manufactured in one cycle of the preform manufacturing means is effected based on the sequence in which they are introduced into the temperature control means.

The device for manufacturing plastic containers can moreover comprise at least one measuring element for determining the temperature of a preform, where the temperature control means is designed and/or configured such that the temperature control of the preform in the temperature control means is carried out depending on the determined temperature. Thereby, the temperature control of the preforms can be adapted to the temperatures of the preforms while they are introduced into the temperature control means.

The at least one measuring element can in particular determine the temperature at one or several points of the surface of the preform. The at least one measuring element can in particular determine a medium temperature of the preform. Preferably, the temperature measurement is contactless.

The at least one measuring element can correspond, for example, to a radiation thermometer, such as a pyrometer or an infrared camera.

The at least one measuring element can be arranged upstream of and/or within the temperature control means. For example, the at least one measuring element can be arranged and/or designed such that it can determine the temperature of a preform during the temperature control in the temperature control means. If the preform has reached a previously determined or desired temperature, in this case the temperature control of the preform can be stopped, for example by a signal of the at least one measuring element. Here, temperature control can be preferably carried out with a microwave and/or laser heating.

As an alternative or in addition, the at least one measuring element can be arranged upstream of the temperature control means and the temperature control of the preforms can be effected based on the determined temperature they exhibit while they are introduced into the temperature control means.

The device can moreover comprise a buffer storage for preforms, wherein in particular the buffer storage is arranged between the preform manufacturing means and the temperature control means. Thereby, the preforms manufactured in the manufacturing means can be intermediately stored in the buffer storage in case of a malfunction of the blow molding machine.

The buffer storage can in particular be designed and/or arranged such that a preform can be conveyed from the preform manufacturing means directly into the buffer storage, and/or from the buffer storage directly into the blow molding machine. In other words, the buffer storage can be connected with the preform manufacturing means and/or the blow molding machine via at least one transport element.

The buffer storage can in particular correspond to a heat-insulated buffer, that means be designed to be heat-insulating. Thereby, residual heat of the preforms still present from the manufacturing process can be maintained for a longer time in the buffer storage.

As an alternative or in addition, the buffer storage can comprise a storage reservoir or correspond to such a storage reservoir, in particular wherein the storage reservoir is arranged separately from the blow molding machine, that means where it is in particular not connected to the blow molding machine via a transport element.

In this case, the preform manufacturing means can be configured such that, when preforms manufactured in the preform manufacturing means are to be conveyed into the storage reservoir, the cycle time of the preform manufacturing means is extended. Thereby, the preforms can become dimensionally more stable before they are introduced into the storage reservoir and thus less stick together as a bulk good.

The device for manufacturing plastic containers can moreover comprise a control element, in particular a closed-loop control element, which is configured such that it controls the operation of the preform manufacturing means and/or the blow molding machine in response to an operating state of the blow molding machine. Thereby, the operation of the preform manufacturing means and/or the blow molding machine can be correspondingly adapted for example in case of a malfunction of the blow molding machine.

For example, the control element, in particular the closed-loop control element, can be configured such that, in case of a malfunction of the blow molding machine, at least one operating parameter of the preform manufacturing means is adapted. The at least one operating parameter of the preform manufacturing means can correspond, for example, to the extruder speed and/or the cycle time of the preform manufacturing means. In case of a malfunction of the blow molding machine, for example the extruder speed can be reduced, and/or the cycle time of the clocked preform manufacturing means can be extended.

The control element, in particular the closed-loop control element, can in particular be configured such that it can change between two predetermined operating settings or recipes for the preform manufacturing means and/or the blow molding machine, in particular in response to an operating state of the blow molding machine.

The control element, in particular the closed-loop control element, can also be configured such that it can determine an operating setting or a recipe for the preform manufacturing means and/or the blow molding machine, in particular in response to an operating state of the blow molding machine. Thereby, for example the adaptation of an operating parameter of the preform manufacturing means can be suitably selected.

The blow molding machine and/or the control element, in particular the closed-loop control element, can be configured such that, after a malfunction of the blow molding machine has been removed, the blow molding machine is operated at reduced power, in particular until all preforms buffered in the buffer storage have been processed. Thereby, the manufactured preforms can still be processed in the blow molding machine, even if they have cooled to room temperature and even if the temperature control means is not designed or dimensioned for heating preforms that have been cooled to room temperature.

The control element, in particular the closed-loop control element, can also be configured such that, after a malfunction of the blow molding machine has been removed and after all preforms buffered in the buffer storage have been processed, the at least one adapted operating parameter of the preform manufacturing means is updated. For example, the extruder speed can be increased again, and/or the cycle time of the clocked preform manufacturing means can be reduced again.

The temperature control means can be embodied to be integrated in the blow molding machine. For example, heating elements and/or cooling air elements of the temperature control means can be arranged on a blow-molding unit of the blow molding machine. By this, the device for manufacturing plastic containers can be embodied to be compact and space-saving.

The disclosure moreover provides a method of manufacturing plastic containers in a device for manufacturing plastic containers, comprising a clocked preform manufacturing means, a temperature control means for thermally conditioning preforms manufactured in the preform manufacturing means, and a blow molding machine, comprising the steps of manufacturing a predetermined number of preforms in a clocked preform manufacturing means and introducing the predetermined number of preforms into a temperature control means for thermally conditioning the preforms, wherein the preforms are differently temperature controlled in the temperature control means, and stretch blow molding the preforms in the blow molding machine to obtain plastic containers.

By the preforms being differently temperature controlled in the temperature control means, one can allow for different temperatures of the preforms while they are introduced into the temperature control means.

The method can in particular be carried out with an above-described device. In this case, the method can comprise the provision of an above-described device.

The predetermined number of preforms can in particular be manufactured in a cycle of the preform manufacturing means.

A first preform that was manufactured in one cycle of the preform manufacturing means and is first introduced into the temperature control means may be less heated than a second preform that was manufactured in the same cycle of the preform manufacturing means and is introduced into the temperature control means after the first preform.

In other words, the temperature control of the predetermined number of preforms can be effected based on the sequence in which they are introduced into the temperature control means.

Before and/or during the temperature control of a preform in the temperature control means, a temperature of the preform can be determined, where the temperature control of the preform is carried out based on the determined temperature.

In other words, the temperature control of the predetermined number of preforms can be effected based on the temperature they exhibit while they are introduced into the temperature control means.

The temperature control of the predetermined number of preforms can also be effected based on the temperature they exhibit during temperature control in the temperature control means. For example, the temperature control of a preform can be stopped as soon as it exhibits a predetermined or desired temperature.

The temperature control of a preform can be determined in particular by an above-described measuring element.

In case of a malfunction of the blow molding machine, the preforms manufactured by the clocked preform manufacturing means can be introduced into a buffer storage. The buffer storage can in particular correspond to a heat-insulated buffer.

In case of a malfunction of the blow molding machine, at least one operating parameter of the clocked preform manufacturing means can be changed. In particular, in case of a malfunction of the blow molding machine, the operation of the preform manufacturing means can be changed from a first predetermined operating setting to a second predetermined operating setting.

After a malfunction of the blow molding machine has been removed, the blow molding machine can be operated at reduced power, in particular until all preforms buffered in the buffer storage have been processed. Thereby, the manufactured preforms can still be processed in the blow molding machine, even if they have cooled to room temperature and even if the temperature control means is not designed or dimensioned for heating preforms that have cooled to room temperature.

BRIEF DESCRIPTION OF THE DRAWINGS

Further advantages and features of the disclosure will be described below with reference to the exemplary figures. In the drawings.

DETAILED DESCRIPTION OF THE PREFERRED EMBODIMENT

Figure 1:
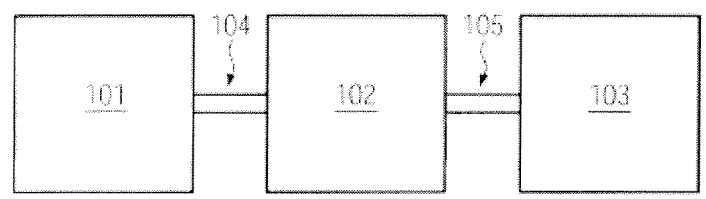
FIG. 1 shows an exemplary device for manufacturing plastic containers.

FIG. 1 shows an exemplary device for manufacturing plastic containers, comprising a clocked preform manufacturing means 101, a temperature control means 102 for thermal conditioning preforms manufactured in the preform manufacturing means 101, and a blow molding machine 103.

So, the device shown in FIG. 1 is a block machine. By the connection of the preform manufacturing means 101 with the temperature control means 102 and the blow molding machine 103 in a block, energy can be saved because the residual heat of the preforms from the manufacturing process, for example the injection molding process, can be utilized. The probability of the preforms getting dirty can also be reduced by the connection in a block.

The clocked preform manufacturing means 101 can in particular be a clocked injection molding means. In the clocked preform manufacturing means 101, preforms can be manufactured in batch operation. In other words, a plurality of preforms, usually 16-96, preferably 72, can be simultaneously manufactured in one cycle.

After the preforms have been injection-molded in the preform manufacturing means 101, the preforms injection-molded in a matrix are first separated and then conveyed via a first conveyor element 104 into the temperature control means 102. The preforms can in particular be introduced into the temperature control means 102 directly after injection molding. Thereby, the preforms are still heated by the injection molding process, which helps saving energy to bring the preforms to the correct temperature.

The temperature control means 102 can be, for example, a microwave temperature control means. As the efficiency of microwave heating clearly increases when the preforms are already heated, in this manner the energy saving effect of the connection of the injection molding apparatus with the temperature control means and the blow molding machine in a block can be disproportionately increased.

In particular, the temperature control means can in this case have smaller dimensions than in a case where the preforms must be heated starting from room temperature. For example, the ratio of heating elements of the heating device to blow molding stations of the blow molding machine can be reduced. For example, the ratio of heating elements of the heating device to blow molding stations of the blow molding machine can be 2:1 or 1:1.

The heating elements can be arranged on a blow-molding unit of the blow molding machine, in particular if the ratio of heating elements to blow molding stations of the blow molding machine is 1:1. Thus, costs, in particular material costs, can be saved.

The temperature control means 102 can in particular comprise several heating elements which can be individually controlled by open-loop or closed-loop control. In particular, the temperature control means 102 can be designed and/or configured such that different preforms can be differently temperature-controlled, in particular heated.

After the preforms have been brought to a predetermined temperature in the temperature control means 102, they are transferred to the blow molding machine 103 by a second conveyor element 105. The blow molding machine 103 can in particular be a stretch-blow molding machine in which the heated preforms are blow-molded, in particular stretch-blow molded, to the plastic containers.

For a constant quality of the stretch-blow molded plastic containers, the temperatures of the heated preforms should vary by no more than +/−1° C.

The preforms can in particular comprise thermoplastic plastics, for example PET (polyethylene terephthalate), or consist of such a plastic material. In the blow molding machine 103, the heated preforms are introduced into one blow mold each, where the blow mold comprises an inner void whose wall surface corresponds to the contour of the plastic container to be formed. After the blow mold has been closed, the preform is subjected to compressed air, so that the blank expands and is pressed from inside against the walls of the blow mold. In addition to blow molding, a stretching rod can be introduced into the blank to stretch it in the longitudinal direction.

Figure 2:
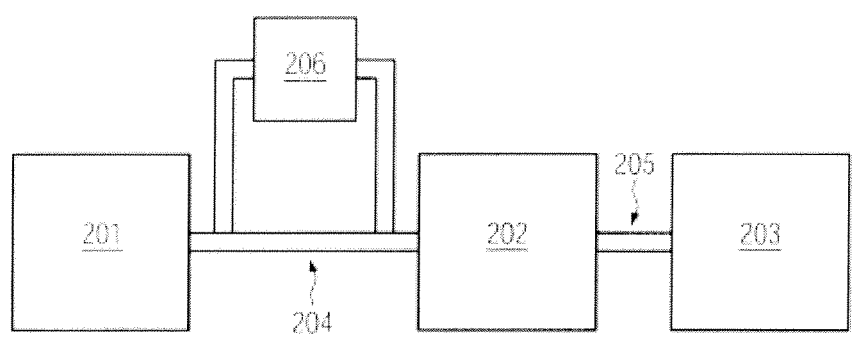
FIG. 2 shows another exemplary device for manufacturing plastic containers.

FIG. 2 shows another example of a device for manufacturing plastic containers. The device comprises a preform manufacturing means 201, a temperature control means 202 and a blow molding machine 203, where the preform manufacturing means 201 is connected with the temperature control means 202 via a first conveyor element 204, and the temperature control means 202 is connected with the blow molding machine via a second conveyor element 205.

The device in FIG. 2 differs from the device in FIG. 1 in that a buffer storage 206 for preforms manufactured in the preform manufacturing means 201 is additionally provided. Preforms manufactured in the preform manufacturing means 201 can be introduced into this buffer storage 206, for example in case of a malfunction of the temperature control means 202 and/or of the blow molding machine 203. So, the buffer storage 206 can serve as intermediate storage for preforms. The buffer storage 206 can in particular be embodied to be heat insulated. Thereby, the heat of the preforms from the manufacturing process can be maintained for a longer time.

The buffer storage 206 and/or the first and the second conveyor elements 204, 205 can be encapsulated. Thereby, contamination of the preforms, in particular by germs, can be prevented or at least reduced. Encapsulated can mean in this connection that a housing is provided for the buffer storage 206 and/or the first and the second conveyor elements 204, 205 whose interior can be kept sterile with respect to the surrounding area. Sterility can be generated here by suited hygienic measures, for example by purging with $H_2O_2$.

Figure 3:
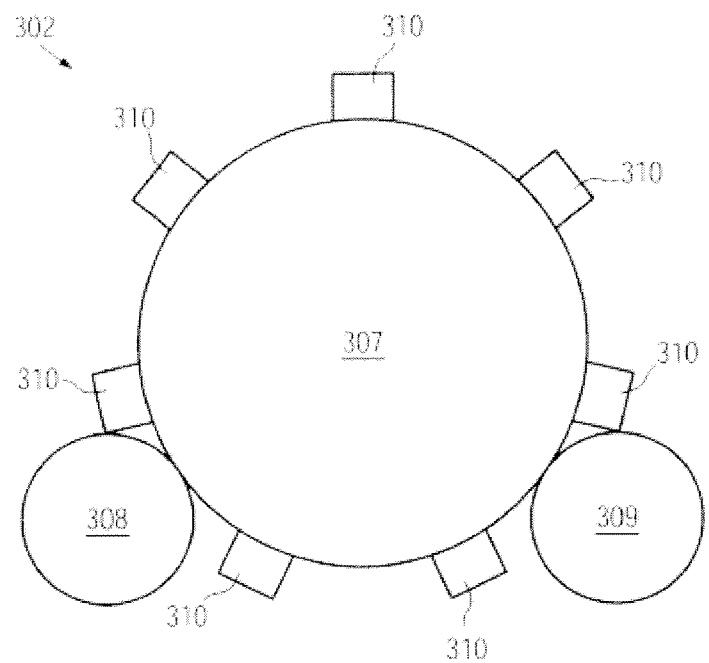
FIG. 3 shows an exemplary temperature control means for thermally conditioning preforms.

FIG. 3 shows an exemplary temperature control means 302 designed as a rotary machine. Here, the exemplary temperature control means 302 comprises a heating wheel 307, an introduction element 308 and a discharge element 309. Several heating elements 310 are arranged at the heating wheel 307. The heating elements 310 can be cavities or heating jackets where preforms can be heated. In particular, the heating elements 310 can be designed such that preforms can be heated differently in different heating elements 310.

As an alternative or in addition, the temperature control means 302 can comprise cooling elements, where in particular preforms can be differently cooled with the cooling elements.

The heating elements 310 can be, for example, microwave heating elements or infrared heating elements, in particular STIR heating elements. STIR (Selectively Transformed Infrared) means that the heating of the preforms is carried out by selectively transformed infrared radiation. For example, the preforms can be introduced into heating jackets which essentially completely surround the preforms except for the mouth section. In the process, a heating pin can be introduced into the preform which at least partially consists of functional ceramics which convert infrared radiation introduced from outside and transmitted through the preform to radiation of another wavelength and reemit it to the preform.

In the example of FIG. 3, the heating elements 310 are arranged on a separate heating wheel 307. The heating elements can, however, also be arranged on a blow-molding unit of the blow molding machine, in particular if the ratio of heating elements to blow molding stations of the blow molding machine is 1:1. Thus, costs, in particular material costs, can be saved.

Figure 4:
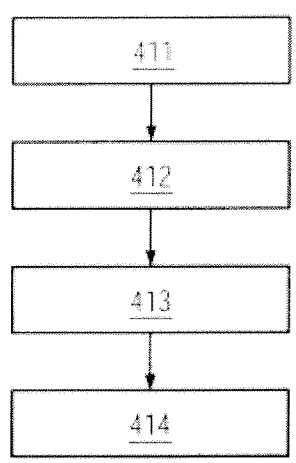
FIG. 4 shows an illustration of an exemplary method of manufacturing plastic containers in the form of a flow chart.

FIG. 4 illustrates an exemplary method of manufacturing plastic containers, for example with one of the exemplary devices shown in FIGS. 1-3.

In a first step 411, a predetermined number of preforms is manufactured in a cycle of a clocked preform manufacturing means. For example, two or more preforms can be simultaneously injection-molded in the clocked preform manufacturing means.

The predetermined number of preforms can then be introduced into a temperature control means in step 412. In particular, the preforms can be introduced into the temperature control means one after the other. For this, the preforms manufactured in one cycle of the clocked preform manufacturing means can be separated before.

Before, after and/or during the introduction of the preforms into the temperature control means, a temperature, for example a mean temperature, can be determined for each of the preforms.

In step 413, the preforms are then temperature controlled, in particular heated, based on the respective temperature intended for them. As the preforms will normally exhibit different temperatures, for example due to different cooling times during the transport from the clocked preform manufacturing means to the temperature control means, the preforms can in particular be differently temperature controlled. For example, the heating duration for a preform can be determined based on the determined temperature for the preform.

The temperature controlled preforms are then introduced into a blow molding machine and there blow-molded, in particular stretch-blow molded, to plastic containers in step 414.

As an alternative or in addition to a temperature control of the preforms based on a measured temperature of the preforms before heating, the temperature control of the preforms can also be effected based on the sequence in which they are introduced into the temperature control means. In particular, the preforms of one cycle of the preform manufacturing means which are introduced into the temperature control means first can be heated to a lesser extent than preforms of the same cycle introduced at a later time.

Figure 5:
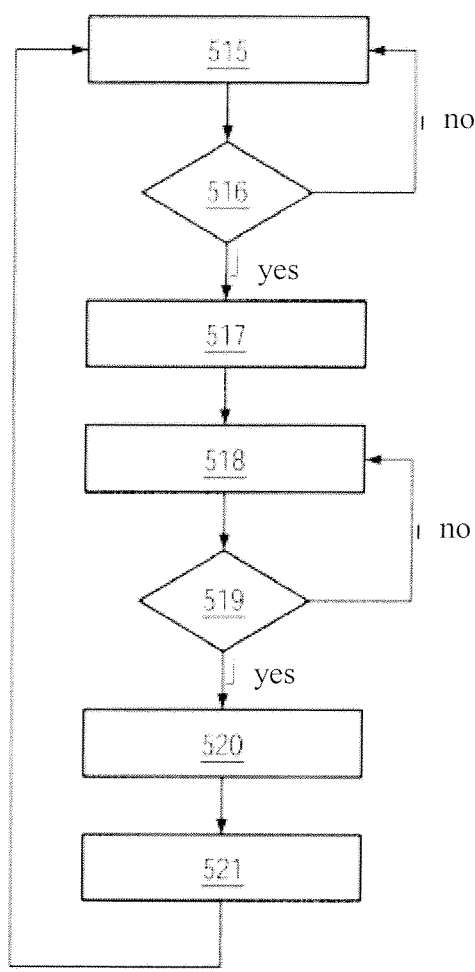
FIG. 5 shows an illustration of another exemplary method of manufacturing plastic containers in the form of a flow chart.

In FIG. 5, another exemplary method of manufacturing plastic containers is illustrated, where a controlling means is provided which controls the operation of a preform manufacturing means and/or a blow molding machine depending on an operating condition of the blow molding machine.

For this, the operating state of the blow molding machine is first determined in step 515 during the manufacture of plastic containers, for example according to a method as it is illustrated in FIG. 4. Step 515 can comprise, for example, a detection of an input by an operator and/or a detection of at least one measured value of at least one measuring device.

In step 516, it can be determined whether the operating state of the blow molding machine requires an adaptation of the operation of the blow molding machine and/or a preform manufacturing means. If this is not the case, the method returns to step 515.

If this is the case, for example in case of a malfunction of the blow molding machine, in step 517 at least one operating parameter of the preform manufacturing means and/or the blow molding machine is adapted. The blow molding machine can for example be uncoupled and stopped, or at least slowed down.

The power of the preform manufacturing means can in this case be reduced, for example to a quarter of its full power. In particular, the preform manufacturing means can be operated at a lower extruder speed and/or with longer cycle times. By the lower extruder speed, the melt supply to the preform manufacturing means can be reduced. The preforms manufactured by the preform manufacturing means can be introduced into a heat-insulated buffer storage.

In step 518, an operating state of the blow molding machine can be determined, in particular analogue to step 515. In step 519, it can be determined whether the operating state of the blow molding machine requires an adaptation of the operation of the blow molding machine and/or the preform manufacturing means, in particular whether the malfunction of the blow molding machine has been removed. If this is not the case, the method can return to step 518 and further observe the operating state of the blow molding machine.

Otherwise, the operation of the blow molding machine can be continued in step 520. Preforms from the heat-insulated buffer storage can then be temperature controlled, in particular heated, in the temperature control means. As soon as the buffer storage has been run empty, the power of the preform manufacturing means can be increased again in step 521. In particular, the extruder speed of the preform manufacturing means can be increased again, and/or the cycle times of the preform manufacturing means can be shortened again.

If the preforms have cooled down in the buffer storage below a predetermined temperature, for example to room temperature, the heating of the preforms can require such a long heating time that the blow molding machine cannot be operated at full power. In this case, in step 520 the operation of the blow molding machine can be continued at reduced power. As soon as the buffer storage has been run empty, in step 521 the ejection performance of the blow molding machine can be increased again, and the blow molding machine and the preform manufacturing means can be operated again at full power. Then, the method can return to step 515.

It will be understood that features mentioned in the above described embodiments are not restricted to these special combinations and are also possible in any other combinations.

The invention claimed is:

1. Device for manufacturing plastic containers, comprising a clocked preform manufacturing means, a temperature control means for thermal conditioning of preforms manufactured in the preform manufacturing means, and a continuously working blow molding machine, wherein the temperature control means is designed and/or configured such that preforms that have been manufactured in one cycle of the preform manufacturing means can be differently temperature controlled, the device further comprising a buffer storage for preforms, wherein the buffer storage is arranged between the preform manufacturing means and the temperature control means, wherein the buffer storage is heat-insulated.

2. Device according to claim 1, wherein the temperature control means is designed and/or configured such that the temperature control of preforms that have been manufactured in one cycle of the preform manufacturing means is effected based on the temperature of the preforms they exhibit while they are introduced into the temperature control means.

3. Device according to claim 1, and a measuring element for determining the temperature of a preform, wherein the temperature control means is designed and/or configured such that the temperature control of the preform in the temperature control means is carried out depending on the determined temperature.

4. Device according to claim 1, wherein the temperature control means is embodied in the form of one of a microwave, a laser heating, or a combination thereof.

5. Device according to claim 1, and a control element which is configured such that it controls the operation of the preform manufacturing means and/or the blow molding machine depending on an operating state of the blow molding machine.

6. Method of manufacturing plastic containers in a device for manufacturing plastic containers, having a clocked preform manufacturing means, a temperature control means for thermal conditioning preforms manufactured in the preform manufacturing means, and a blow molding machine, comprising:
   manufacturing a predetermined number of preforms in the clocked preform manufacturing means; and
   introducing the predetermined number of preforms into the temperature control means for thermal conditioning the preforms, wherein the preforms are differently temperature controlled in the temperature control means; and
   stretch blow molding of the preforms in the blow molding machine to obtain plastic containers,
   wherein in case of a malfunction of the blow molding machine, the preforms manufactured by the clocked preform manufacturing means are introduced into a heat-insulated buffer storage.

7. Method according to claim 6, wherein before and/or during the heating of a preform in the temperature control means, determining a temperature of the preform and carrying out the temperature control of the preform based on the determined temperature.

8. Method according to claim 6, wherein in case of a malfunction of the blow molding machine, changing at least one operating parameter of the clocked preform manufacturing means.

9. Method according to claim 6, wherein after a malfunction of the blow molding machine has been removed, operating the blow molding machine at reduced power until all preforms stored in the buffer storage have been processed.

10. Device according to claim 5, wherein the control element is a closed-loop central element.

11. Method of manufacturing plastic containers in a device for manufacturing plastic containers, having a clocked preform manufacturing means, a temperature control means for thermal conditioning preforms manufactured in the preform manufacturing means, and a blow molding machine, comprising:
   manufacturing a predetermined number of preforms in the clocked preform manufacturing means; and
   introducing the predetermined number of preforms into the temperature control means for thermal conditioning the preforms, wherein the preforms are differently temperature controlled in the temperature contorl means; and
   stretch blow molding of the preforms in the blow molding machine to obtain plastic containers;
   wherein in the case of a malfunction of the blow molding machine, the preforms manufactured by the clocked preform manufacturing means are introduced into a buffer storage;
   wherein after a malfunction of the blow molding machine has been removed, operating the blow molding machine at reduced power until all preforms stored in the buffer storage have been processed.

\* \* \* \* \*